United States Patent [19]

Makosch et al.

[11] Patent Number: 4,498,771
[45] Date of Patent: Feb. 12, 1985

[54] METHOD AND MEANS FOR INTERFEROMETRIC SURFACE TOPOGRAPHY

[75] Inventors: Günter Makosch, Sindelfingen-Maichingen; Franz Schedewie, Boblingen, both of Fed. Rep. of Germany

[73] Assignee: International Business Machines Corporation, Armonk, N.Y.

[21] Appl. No.: 374,135

[22] Filed: May 3, 1982

[30] Foreign Application Priority Data

Sep. 17, 1981 [EP] European Pat. Off. ......... 81107336.0

[51] Int. Cl.$^3$ ............................................... G01B 9/02
[52] U.S. Cl. ..................................... 356/351; 356/359
[58] Field of Search ............... 356/351, 357, 358, 359, 356/360

[56] References Cited

U.S. PATENT DOCUMENTS

| | | | |
|---|---|---|---|
| 3,623,813 | 11/1971 | Hacman | 356/357 |
| 3,849,003 | 11/1974 | Velzel | 356/351 |
| 3,958,884 | 5/1976 | Smith | 356/351 X |
| 4,298,283 | 11/1981 | Makosch et al. | 356/351 |
| 4,358,201 | 11/1982 | Makosch | 356/357 X |

OTHER PUBLICATIONS

Sawatari, "Surface Flaw Detection Using Oblique Angle Illumination", *Applied Optics,* vol. 11, No. 6, pp. 1337–1344, Jun. 1972.

*Primary Examiner*—Davis L. Willis
*Assistant Examiner*—Matthew W. Koren
*Attorney, Agent, or Firm*—N. N. Kallman; Otto Schmid, Jr.

[57] ABSTRACT

For the point-by-point interferometric measuring of surfaces which are scanned along lines, or which are subjected to a processing procedure (e.g. etching) a focused laser beam is directed with oblique incidence as a measuring beam onto the respective measured points. The respective height of a measured point determines the path difference (phase difference) between the measuring beam and a reference beam which has been suitably split off the input beam. The oblique incidence (angle of incidence $\gtrsim 80°$) makes it possible to measure interferometrically very rough surfaces. The measuring range may be extended if the reference beam is directed at an oblique angle of incidence, differing only slightly from that of the measuring beam onto the surface to be examined.

12 Claims, 8 Drawing Figures

METHOD AND MEANS FOR INTERFEROMETRIC SURFACE TOPOGRAPHY

TECHNICAL FIELD

This invention relates to a method and means for determining the topography of surfaces by interferometry.

BACKGROUND ART

In many modern manufacturing processes, particularly in the semiconductor field, very narrow tolerances have to be observed for the surfaces to be processed. Parameters of interest in these processes are the planarity of the surface, its positive or negative slopes and the positions of maxima and minima. Apart from the static determination of the topography of a surface to be processed, process control requires the supervision of the modification with respect to time of that surface. Another desirable feature is a maximum measuring range since micrometer precision and better may be required. Also ranges of some 100 $\mu$m may be covered.

For high precision measurements, interferometric processes are known where the phase difference (the path difference) between a measuring and a reference beam is evaluated. With these processes it is possible to produce a contour line of the entire measured surface, as in UK Pat. No. 1,538,811, or the measuring beam effects a point by point probing of the surface. However, with these known interferometric methods it is necessary that the phase relation between the two beams is not disturbed. In connection with highly scattering surfaces however, in particular those where the mean surface roughness has reached the order of the wavelength used, this condition is no longer satisfied. The field of application of these methods could be extended through infrared illumination, but this would include the problems observed in the optics, adjustment, and evaluation of interferometric methods in the infrared range. For the practical application of interferometric methods it is highly desirable to increase their measuring scope which is limited per se to be able to measure step heights of some 10 $\mu$m on rough surface, by way of example.

An object of the present invention is to provide an interferometric measuring method and means of the above specified type permitting the precise measuring of the topography of rough surfaces.

SUMMARY OF THE INVENTION

In accordance with this invention, an interference method with grazing angle beam incidence is used for highly scattering, as well as for reflecting surfaces. The method is applied to a plurality of measuring problems to determine surface topography. The surface is scanned point by point along suitable lines to determine the surface point modifications with respect to time and the chronological execution of the stationary measuring signal is registered. By slightly altering the beam path, the measuring range available can be made wide or small. For small measuring ranges, the resolution is in the submicron range. A particular embodiment of the method is used for contact-free in situ measuring of etching rates in connection with dry etching. The measuring signal is evaluated with high precision in accordance with a known phase compensation method.

BRIEF DESCRIPTION OF THE DRAWINGS

The invention will be described in detail with reference to the drawings, in which.

DISCLOSURE OF THE INVENTION

The measuring method of this invention is based on the use of a measuring beam directed at a wide angle of incidence (grazing probing) onto the (rough) measured surface. With angles of incidence in the order of 80° the rough measured surface is to the measuring beam like a planar reflecting surface defined by the highest peaks in the rough surface. In this manner, a well-defined phase relation is obtained between the individual points of the measuring beam and consequently also between measuring beam and reference beam.

Figure 1A:
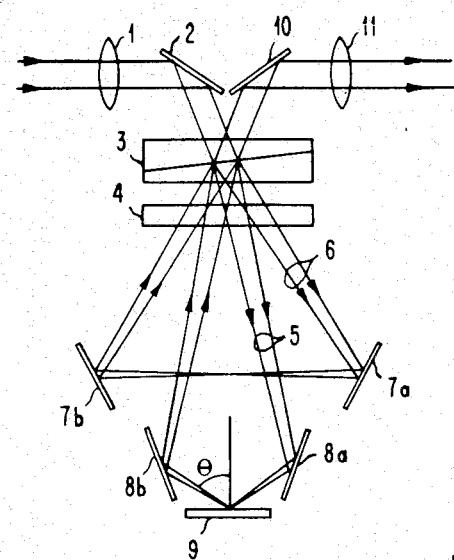
FIG. 1A is a representational view of the basic structure of an interferometric measuring head with grazing incidence of the measuring beam.

FIG. 1A depicts the embodiment of an interferometric measuring head operating in accordance with the above-described principle. The polarized output beam of a laser is directed from the left through a converging lens 1 and passes via a deflecting mirror 2 to a birefringent crystal 3, such as a Wollaston prism, where it is split into two beams, i.e. a measuring beam 5 and a reference beam 6 both passing through a $\lambda/4$ plate 4. After two reflections from deflecting mirrors 7a and 7b, reference beam 6 is again directed via the $\lambda/4$ plate into the birefringent crystal. After having been reflected from deflecting mirror 8a, measuring beam 5 impinges at an angle of incidence $\theta$ onto surface 9 to be examined. Due to the oblique incidence, the measuring beam is regularly reflected and also returns via deflecting mirror 8b and the $\lambda/4$ plate to birefringent crystal 3. Thus both beams pass twice through $\lambda/4$ plate 4 so that their direction of polarization is turned by 90°. The roles of the ordinary and extraordinary beam in birefringent crystal 3 are thus exchanged for the reflection beams with respect to the input beams, and both reflected beams exit from birefringent crystal 3 as collinear beams with mutually orthogonally oriented polarization. After having been reflected from another deflecting mirror 10, the reflected beams are collimated in converging lens 11, and can then be applied to an evaluator sensitive for phase differences in mutually orthogonally polarized partial beams.

The refractive power of lenses 1 and 11 is such that the focal point of the measuring beam is on the surface of sample 9. For reasons of focusing and coherence, the optical path length of reference beam 6 should approximately equal that of measuring beam 5.

Figure 1B:
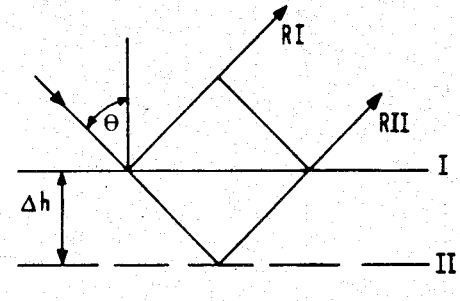
FIG. 1B is a schematic representation of the beam path in the measuring head in accordance with FIG. 1A.

For the point-by-point recording of surface profile, measuring surface 9 is displaced under the focused measuring beam 5, e.g. in a raster-like movement. Height modifications of the surface are evident from a modification of the phase difference between both beams. In accordance with FIG. 1B, a height modification $\Delta h$ of the reflecting surface from position I to position II effects a phase difference of the reflected beams RI and RII with respect to the reference beam by the value $$\phi_m = (4\pi/\lambda) \cdot \Delta h \cdot \cos\theta \tag{1}$$

with $\theta$ = angle of incidence of the measuring beam, $\lambda$ = radiation wavelength.

The easiest way of visually observing the phase difference between the two mutually orthogonally polarized part beams exiting from lens 11 is to provide behind lens 11 a polarizer with a azimuth angle of 45° to the directions of polarization. The partial beam portions permitted to pass through the polarizer interfere with each other and produce an output signal whose intensity depends on the respective height difference. With a continuous height modification, the height difference $\Delta hO$ for which there appear two successive interference minima is determined by $$\Delta hO = \lambda/2\cos\theta \tag{2}$$

For the large angles of incidence discussed here, the value of $\Delta hO$ is approximately 2u; height differences within that range can thus be uniquely defined. Height differences exceeding these limits are determined only to multiples of $\Delta hO$ (owing to the $2\pi$ periodicity of $\phi_m$ in equation (1)).

Figure 2A:
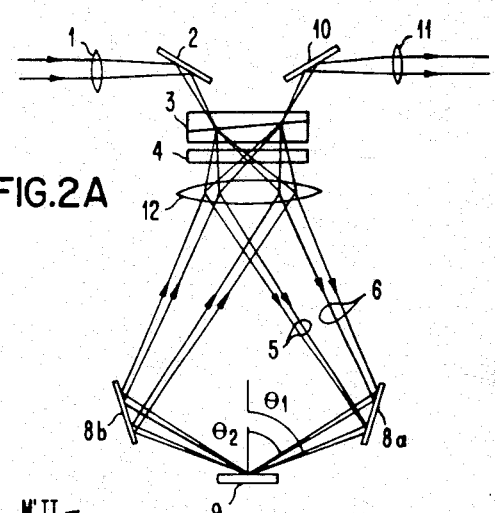
FIG. 2A depicts an implementation of the measuring head in accordance with FIG. 1A, with an increased measuring range.

FIG. 2A represents an interferometric measuring head which also operates with a grazing incidence of the measuring beam, but where the uniquely defined measuring range is considerably increased compared with the measuring head according to FIG. 1. This increase is achieved in that reference beam 6 is also directed at a large angle of incidence and focused onto the point of measured surface 9 which is impinged upon by measuring beam 5. As in the example of FIG. 1A, the two beams 5 and 6 are produced by the splitting of an input beam in a birefringent crystal 3, the refractive force of input lens 1 being such that its focal point is in birefringent crystal 3. The divergent output beams of birefringent crystal 3 pass through a $\lambda/4$ plate 4, and are focused with a lens 12 via a common deflecting mirror 8a onto sample 9. The reflected light reaches, via a deflecting mirror 8b, lens 12 and $\lambda/4$ plate 4, the birefringent crystal 3 again, where in the known manner both beams are combined into a common output. This beam is directed via deflecting mirror 10 to output lens 11, from which it exits as a parallel beam with mutually orthogonally polarized partial beams.

The angles of incidence $\theta1$ and $\theta2$ of the two beams are such that there is a regular reflection also from a rough surface 9. The difference between both angles of incidence is in the order of one or a few degrees. In one example it amounted to $\theta1 = 80°$, $\theta2 = 80.92°$.

Figure 2B:
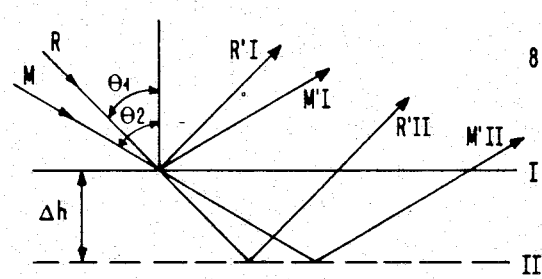
FIG. 2B is a schematic representation of the beam path in the measuring head according to FIG. 2A.

The beam path in the measuring head according to FIG. 2A is represented by FIG. 2B for two successive measurings, where there had been a height modification of the measured surface by $\Delta h$. In position II, the phase difference between reference beam R'II and measuring beam M'II is given compared with the conditions in case of a reflection in position I by:

$$\phi_n = (4\pi\Delta h/\lambda)(\cos\theta1 - \cos\theta2) \tag{3}$$

(with $\theta1 < \theta2$).

The condition $\phi_m \, 2\pi$ which has to be satisfied if the covered height region $\Delta h$ is to be uniquely measurable, is in the present case equal to $$\cos\theta1 - \cos\theta2 > \lambda/2\Delta h \tag{4}$$

so that the range of uniqueness $\Delta hO$ of the above-mentioned values for $\theta1$, $\theta2$ is approximately 20 $\mu$m. In a surface scanning it will thus be possible to define height modifications or steps of up to 20 $\mu$m.

Apart from the above-described evaluation of the phase difference in the output beam by means of a polarizer, there exists a phase-sensitive evaluation method where the phase difference of two mutually orthogonally polarized collinear part beams is measured with very high precision through electro-optical compensation. Details of this measuring process are described in U.S. Pat. No. 4,298,283.

Figure 3A:
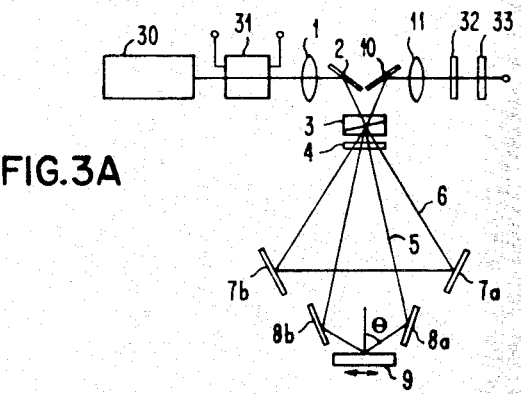
FIG. 3A is a schematic structure of a complete device for interferometrically measuring rough surfaces with a measuring head in accordance with FIG. 1A.

FIG. 3A shows a complete measuring arrangement with this phase-sensitive evaluation, and with a measuring head in accordance with FIG. 1A. The polarized output beam of a laser 30 is split in an electro-optical modulator 31 into two mutually orthogonally polarized partial beams, and their phase difference is periodically altered with an alternating voltage applied to electro-optical modulator 31. After having passed through the measuring head according to FIG. 1, the output beam with the mutually orthogonally polarized partial beams reaches a polarizer 32. The intensity of the beams interfering with each other is measured with a detector 33. From the position of the zeros of the output signal which correspond to the compensation times, the phase alteration caused by the height modification of object 9 can be determined with a very high precision. A phase measuring resolution of $6 \times 10^{-3}\pi$ is possible with this method. Accordingly, for the measuring head of FIG. 1 with an angle of incidence of 80° and a wavelength $\lambda = 0.6328$ $\mu$m a measuring resolution of $\Delta h = 5 \times 10^{-3}$ $\mu$m is realized. For the measuring head of FIG. 2A with the same parameters, a measuring resolution of $\Delta h = 6 \times 10^{-2}$ $\mu$m is realized.

Figure 3B:
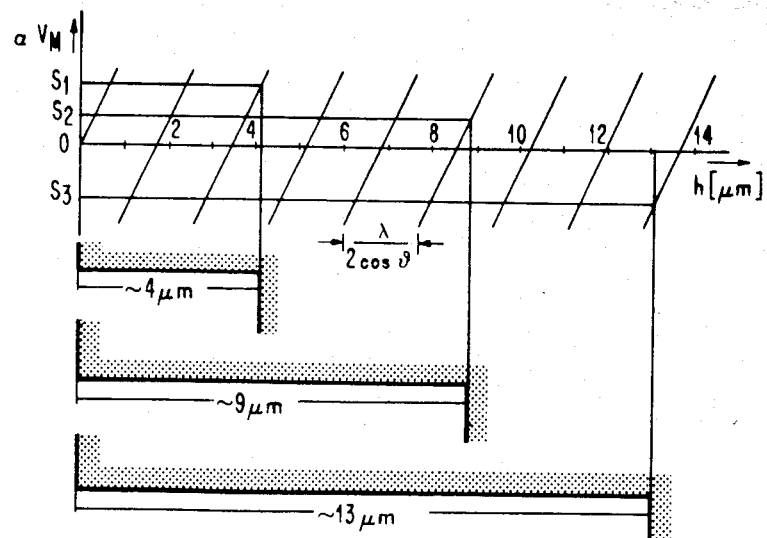
FIG. 3B illustrates the output signals of the measuring device during the determination of different step heights.

FIG. 3B shows the output signal of the phase measuring method with a measuring head according to FIG. 1A for three step heights all greater than the maximum measuring range $\lambda/(2\cos\theta)$ of the arrangement. The strictly linear dependence between output signal and height modification within the unique measuring range $\lambda/(2\cos\theta)$ can be clearly concluded therefrom. In a slow height modification of the measured surface exceeding the unique measured region, the height modification can be ascertained in that the number of sawtooth periods in the measuring signal is determined. In case of abrupt height changes, e.g. vertical steps, this method cannot be applied so that if the unique measured region is exceeded, the approximate step height has to be found with another method, e.g. by mechanical scanning with a measuring stylus (FIG. 3 gives these approximate values for the respective step heights).

The present interferometric measuring method with grazing incidence is furthermore particularly suitable for the in situ measuring of etching rates in connection with substances which are contained in a reaction vessel, and are to be measured without direct contact. In that case, the focused measuring beam is directed stationarily onto a predetermined point of the etched surface, and the modification with respect to time of the phase difference to a stationary reference beam is determined.

Figure 4A:
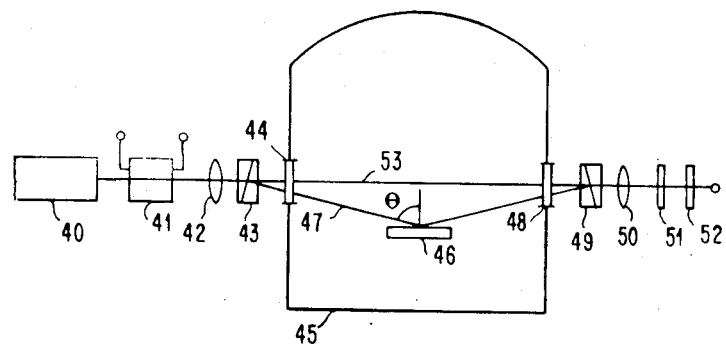
FIG. 4A is a schematic view of an interferometric arrangement for the in situ determination of etch rates.

FIG. 4A represents an arrangement for determining etching rates, which arrangement operates according to the same principle as the measuring head of FIG. 1A. The output beam of a laser 40 is split in an electro-optical modulator 41 into two mutually orthogonally polarized partial beams whose relative phase difference is periodically varied by an alternating voltage. Both partial beams subsequently pass through a lens 42 and are split in an electro-optical crystal 43 (e.g. Rochon prism). The split beams pass through an optical window 44 and enter a reaction vessel 45 where the surface of a sample 46 is to be processed through reactive ion etching, for example. Measuring beam 47 impinges at an angle $\theta$ onto the etched surface and is focused there by means of lens 42. The regularly reflected light of measuring beam 47 and reference beam 53 pass through reaction vessel 45 in a straight line, and then through optical window 48 to another electro-optical crystal 49 (second Rochon prism), where both beams are recombined. After collimation in converging lens 50, both beams enter a phase sensitive-detector 52 through a polarizer 51.

Figure 4B:
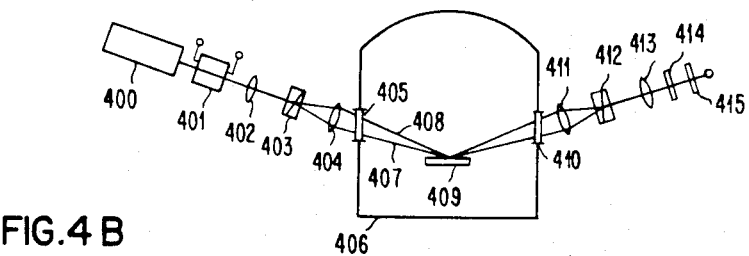
FIG. 4B is a schematic structure of another interferometric device for the in situ etch rate determination.

In FIG. 4B, another arrangement for determining etching rates is shown which functionally corresponds to the measuring head of FIG. 2A. The output beam of a laser 400 is split in a known manner in electro-optical prism 401, and the partial beams are focused with converging lens 402 in Wollaston prism 403 effecting a spatial splitting of the partial beams. The beams divergently exiting from Wollaston prism 403 are focused with converging lens 404 on the surface of etched probe 409 which is contained in a reaction vessel 406. The angles of incidence of both beams are great (80° and more), and they differ only slightly. Measuring beam 407 and reference beam 408 reach via optical window 405 reaction vessel 406, and exit therefrom through optical window 410. In converging lens 411 both reflected beams are focused onto Wollaston prism 412, and the divergent beams exiting therefrom are collimated in converging lens 413. After having passed through analyzer 414, the signal indicating the respective phase difference is generated in photodetector 415.

In the arrangements for the etch rate determination in accordance with FIGS. 4A and 4B, it is required that during the entire measuring process there are no unintentional relative shifts between measuring and reference beams. In that respect, the arrangement according to FIG. 4B is to be preferred since the measuring beam and reference beam are similarly directed through the reaction vessel. In order to increase the measuring stability, it is also possible to use control systems where slow modifications are measured, and the output signal of the interferometric arrangement is compensated accordingly. The influence of mechanical oscillations, to give an example, can be eliminated through measurings following each other in rapid succession.

With the method described here, it is possible to determine with a very spatial resolution (size of the focused laser light spot approximately 0.1 mm) and high measuring resolution ($10^{-2}$ $\mu$m and better) the average etching depth of a substrate of considerable roughness (up to 2 $\mu$m from peak to peak).

What is claimed is:
1. Apparatus for interferometrically determining the topography of a surface through point-by-point probing comprising:
   laser means for providing a polarized beam of optical radiation:
   a single birefringent crystal element for splitting said polarized beam into a measuring beam and a reference beam;
   means for directing said measuring beam to impinge on said surface at an oblique grazing angle of incidence;
   means for reflecting said reference beam and said measuring beam after impingement on said surface so that said measuring and reference beams are directed through said single birefringent crystal element;
   means for collimating said reflected measuring and reference beams after passage through said element;
   said collimated beams being characterized by phase differences representing variations in topography of said surface; and
   means for detecting said phase differences so that variations in surface topography are determined.

2. Apparatus as in claim 1, additionally comprising modulator means for splitting said polarized beam into two mutually orthogonally polarized partial beams whose relative phase difference is periodically varied by an alternating voltage; said partial beams being directed to said single birefringent crystal for splitting said partial beams to produce said measuring beam and said reference beam.

3. Apparatus as in claim 1, wherein said birefringent crystal element means is a Wollaston prism.

4. Apparatus as in claim 1, including a $\lambda/4$ plate through which said measuring and reference beams are passed twice.

5. Apparatus as in claim 1, wherein said measuring beam is focused on said surface and said reference beam is focused in the focal point of said measuring beam.

6. Apparatus as in claim 1, wherein said grazing angle of incidence is approximately 80°.

7. Apparatus as in claim 1, wherein said phase differences detecting means is a polarizer with an azimuth angle of 45° to the direction of polarization of said measuring and reference beams at the output of said collimating means.

8. Apparatus as in claim 1, wherein the lengths of said optical paths of the measuring and reference beams are substantially the same.

9. A method of interferometrically determining the topography of a surface through point-by-point probing comprising the steps of:
   providing an optical measuring beam and a reference beam;
   directing and focusing said measuring beam through a modulator and prism splitting means onto different points of said surface at a grazing angle of incidence;
   directing and focusing said reference beam at the focal point of said measuring beam;
   reflecting said measuring and reference beams from different points of said surface;
   directing said beams through said prism splitting means, said beams characterized by phase differences representative of changes in topography of said surface; and detecting such phase differences that represent variations in surface height at different points on the surface.

10. A method as in claim 9, wherein said grazing angle of incidence is approximately 80°.

11. A method as in claim 9, including the step of guiding the measuring beam along a predetermined line over the surface to be examined so that the height profile of the surface along said line is recorded.

12. A method as in claim 9, wherein the measuring beam is directed to a predetermined point on the surface to be examined so that the surface height modification with respect to time is determined.

* * * * *